United States Patent [19]

Sticht

[11] Patent Number: 4,725,193
[45] Date of Patent: Feb. 16, 1988

[54] SYSTEM FOR HANDLING STRUCTURAL COMPONENTS

[76] Inventor: Walter Sticht, Karl-Heinrich-Waggerl-Strasse 8, A-4800 Attnang-Puchheim, Austria

[21] Appl. No.: 854,776

[22] Filed: Apr. 22, 1986

[30] Foreign Application Priority Data

May 9, 1985 [AT] Austria .............................. 1397/85

[51] Int. Cl.⁴ .............................................. B65G 47/00
[52] U.S. Cl. ....................................... 414/751; 52/739; 212/205; 414/749; 901/27
[58] Field of Search ........ 414/749, 751, 752, 540–542, 414/592, 750, 753, 621, 671; 901/14, 16, 27, 28; 74/27; 384/45; 104/17.1, 17.2; 52/730, 735, 739; 187/95; 212/205; 269/55, 71, 73

[56] References Cited

U.S. PATENT DOCUMENTS

| | | | |
|---|---|---|---|
| 3,751,997 | 8/1973 | Owen, Jr. et al. | 414/750 X |
| 3,844,417 | 10/1974 | Holm | 212/205 |
| 3,897,982 | 8/1975 | Teramachi | 384/45 |
| 4,041,899 | 8/1977 | Wolfe et al. | 74/27 X |
| 4,162,018 | 7/1979 | Arya | 414/752 X |
| 4,273,389 | 6/1981 | Takai | 384/45 |
| 4,369,872 | 1/1983 | Sticht | 198/339 |
| 4,580,942 | 4/1986 | Miksch et al. | 901/14 X |
| 4,600,358 | 7/1986 | Graf | 901/16 X |
| 4,604,021 | 8/1986 | Werner | 414/751 X |
| 4,604,027 | 8/1986 | Becker et al. | 901/16 X |
| 4,615,163 | 10/1986 | Curtis et al. | 52/730 |
| 4,666,367 | 5/1987 | Sticht | 414/751 |

FOREIGN PATENT DOCUMENTS

| | | | |
|---|---|---|---|
| 2531656 | 2/1977 | Fed. Rep. of Germany | 52/730 |
| 2143205 | 2/1985 | United Kingdom | 901/16 |
| 520316 | 8/1976 | U.S.S.R. | 212/205 |

OTHER PUBLICATIONS

"Clean Room Robot", IBM Tech. Discl. Bull., vol. 25, No. 4, Sep. 1982, pp. 2226–2228.
"Rhino Robots", Linear Slide Base, Oct. 1983, 2 Pages.

Primary Examiner—Robert J. Spar
Assistant Examiner—P. McCoy Smith
Attorney, Agent, or Firm—Kurt Kelman

[57] ABSTRACT

A handling system for components or tools comprises a guiding track formed by a pair of spaced parallel guiding posts, on which is displaceably mounted an intermediate carrier for the components coupled to an apparatus for displacing and positioning the intermediate carrier along the guiding posts, in which the guiding posts are associated with respective support elements extending parallel and lengthwise of the posts and transversely therefrom the support elements being arranged to stiffen the guiding posts and support them against bending due to operating forces on the carrier when handling components or tools.

7 Claims, 8 Drawing Figures

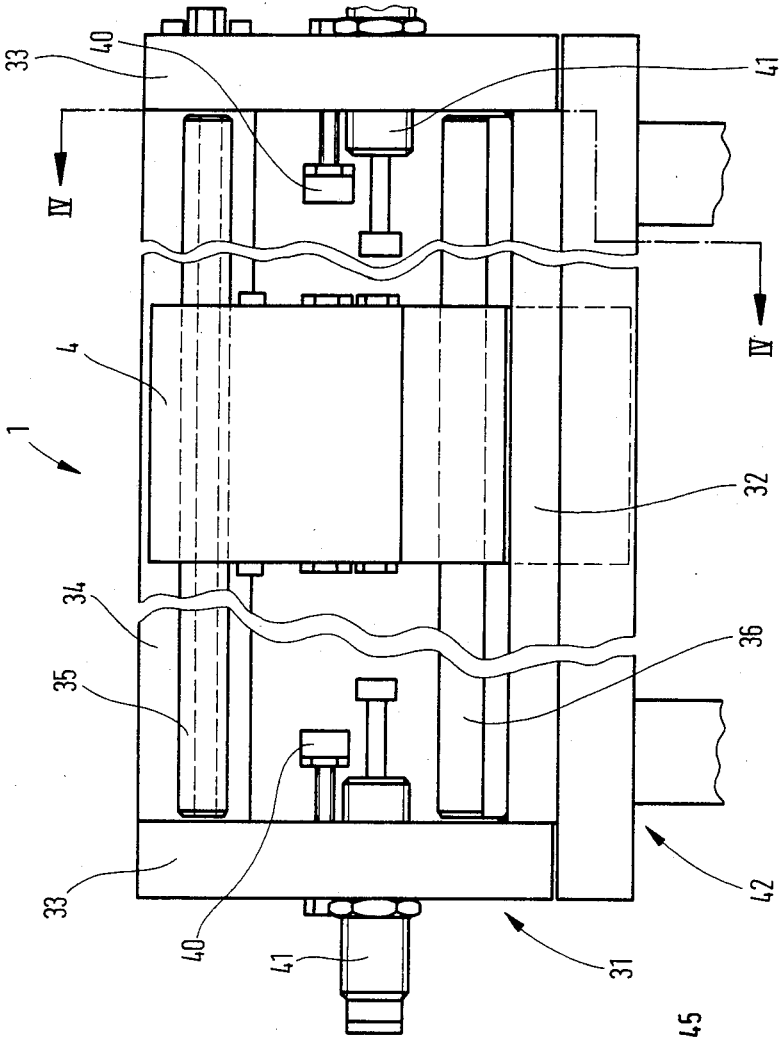
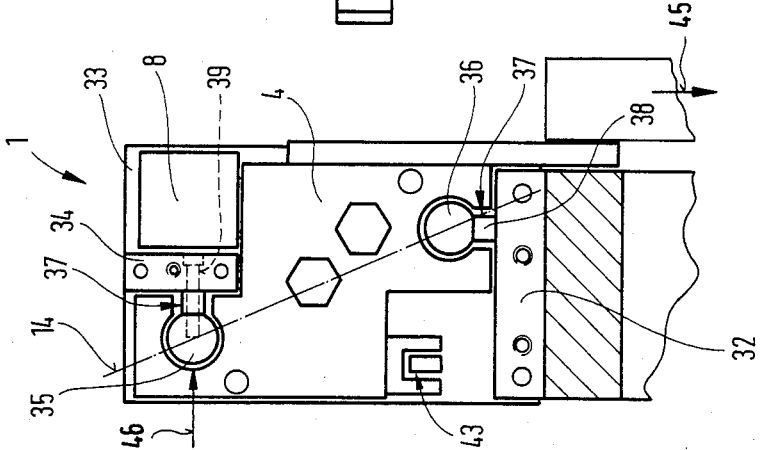

SYSTEM FOR HANDLING STRUCTURAL COMPONENTS

BACKGROUND OF THE INVENTION

1. Field of the Invention

The invention relates to a system for handling or positioning structural components or tools comprising a guiding track formed by guiding posts, on which an intermediate support coupled to a displacing mechanism is displaceably mounted, as well as comprising a device for positioning the intermediate support. The problem of the invention is resolved in that the guiding track for the intermediate support has its terminal portions installed in carrier plates, and that the carrier plates are connected via a support plate extending parallel to the guiding track, and that two guiding posts forming the guiding track are situated in a plane extending obliquely to the vertical.

2. Description of the Prior Art

It is known from my U.S. Pat. No. 4,369,872 to provide systems for the handling of components comprising several rectilinear guiding tracks aligned angularly with respect to each other and along which a gripper element is displaceable in several spatial directions extending angularly with respect to each other. Mechanical end stops are provided to limit the displacements of the gripper elements along the guiding track in the different spatial directions. If, in this connection, differently positioned stops at one terminal position are placed in the path of displacement of the individual gripper elements, it is possible to impinge on several terminal positions with the gripper element along the longitudinal guiding track. Systems of this nature have proved to be very satisfactory in practice, since the separate positions are precisely reproducible even in the case of a large number of operating cycles and large and rapidly displaced weights. The smoothness of operation and positioning precision at the terminal settings may however be inadequate in many cases of application.

Systems for the handling of components are also known from U.S. 3,760,956—which are known as robots. It is possible with these systems to impinge against optional positions or terminal settings along a guiding track. These different positions are formed either by a device which is continuously active for the purpose of detecting the position of the displaced machine or gripper elements or of their driving elements, or by end stops displaceable along the guiding track which are intended to allow for a decelerating displacement of the machine element or gripper via the drive and of the stopping of the element with optimum precision at the required position. These devices have proved satisfactory in the fields in which spatial paths of displacement are required, but because of the numerous articulation points and the freely projecting arrangement of the grippers, the required smoothness of operation and precise displacement and positioning cannot always be maintained.

OBJECTS AND SUMMARY OF THE INVENTION

It is an object to provide a system for the production or handling of components or tools, in which intermediate supports, carriers or handling mechanisms may be guided as smoothly as possible along a guiding track and positioned with dimensional precision at optional terminal settings along the guiding track.

A handling system for handling or positioning of components or tools, according to the invention comprises a guiding track formed by a pair of spaced parallel guiding posts, on which is displaceably mounted an intermediate carrier for the components coupled to means for displacing and positioning the intermediate carrier along the guiding posts, in which the guiding posts are associated with respective support elements extending parallel to and lengthwise of the posts and transversely therefrom, the support elements being arranged to stiffen the guiding posts and support them against bending due to operating forces on the carrier when handling components or tools.

Suitably the support elements extend from the guiding posts in respective transverse directions which extend angularly with respect to each other.

A reinforcement of the guiding posts is secured thereby against flexing in two mutually orthogonal spatial directions, and a rectilinear, oscillation-free and precise guiding of an intermediate carrier may thus be obtained with correspondingly light guiding posts. Thanks to the reinforcement of the guiding posts in the direction of principal stress and to the shifting of the reinforcing directions into two different spatial planes, the guiding post is reinforced only in the directions of principal stress, whereas it is possible to manage with little expenditure on material and thus weight in the other directions of stress.

Provision is made according to another feature that the support elements are formed by bars of rectangular cross-section in particular, whereof the cross-sectional width is smaller than a diameter of the guiding posts, and a cross-sectional height, the cross-sectional height of the support bars associated with the two guiding posts being inclined to each other, in particular at 90°, and the support elements preferably being centrally arranged with respect to a central longitudinal axis of the guiding posts. This assures an unexceptionable guiding along the guiding posts, so that an application of ball-bearing guides is possible and that it is possible to make do with guiding tracks having a space requirement corresponding to normal.

It is also advantageous if the guiding posts are provided with a longitudinal groove whereof the cross-sectional width corresponds to the cross-sectional width of the support bars and the longitudinal grooves associated with the guiding posts are turned or displaced through 90° with respect to each other, since an unexceptionable transmission of force from the guiding posts to the carrier elements is assured thereby.

According to another embodiment, provision is made for the support elements to be arranged parallel to a plane extending tangentially to the guiding posts and to be connected in force-locked manner to the guiding posts in at least one direction extending parallel to one spatial direction, whereby the space requirement of the support bars may be kept small.

Provision is made according to another embodiment for the support elements to be situated in mirror-image quadrants of the cross-sectional areas of the guiding posts, an approximately uniform reinforcement of the guiding posts and of the guiding track formed by the guiding posts, being obtained thereby in both guiding posts and in three different spatial directions.

It is also possible for the support elements to be situated between the guiding posts and respective carrier plates, the carrier plates being situated in planes at right angles to each other and support bars comprising the support elements being connected to the carrier plates via releasable securing elements, since a support for the guiding posts may thereby be secured throughout the length of the guiding track, and the support elements for reinforcement of the guiding posts may be utilised at the same time for their fastening.

Provision is made according to another embodiment for a resistance moment of the support elements to correspond at least to a maximum bending moment exerted on the guiding posts and the cross-sectional height is varied so that the moment of resistance is adapted approximately to the course of the flexing line, preferably throughout the longitudinal extension, whereby an approximately constant deflection and thus an approximately constant degree of precision are obtained throughout the length of the guiding posts.

It is advantageous furthermore if the support elements are associated with a section of the guiding posts extending between two carrier plates, since it is possible thereby to make do with cylindrical bearing points in the carrier plates.

It is advantageous for the guiding posts to be fixedly arranged in their longitudinal direction in one carrier plate and displaceably in the oppositely situated carrier plate, since the longitudinal variations of the guiding posts caused by the different temperatures may be accommodated thereby and strains may be prevented upon installing handling apparatus comprising reinforced guiding posts.

BRIEF DESCRIPTION OF THE DRAWINGS

The invention will now be described, by way of example, with reference to the accompanying partly diagrammatic drawings, in which:

FIG. 5 is an end elevation of a further embodiment of a handling system according to the invention and comprising carrier bars borne on bearing plates, partially cross-sectioned along the lines IV—IV in FIG. 5;

FIG. 6 is a side elevation of the system of FIG. 5;

DETAILED DESCRIPTION OF THE PREFERRED EMBODIMENTS

Figure 1:
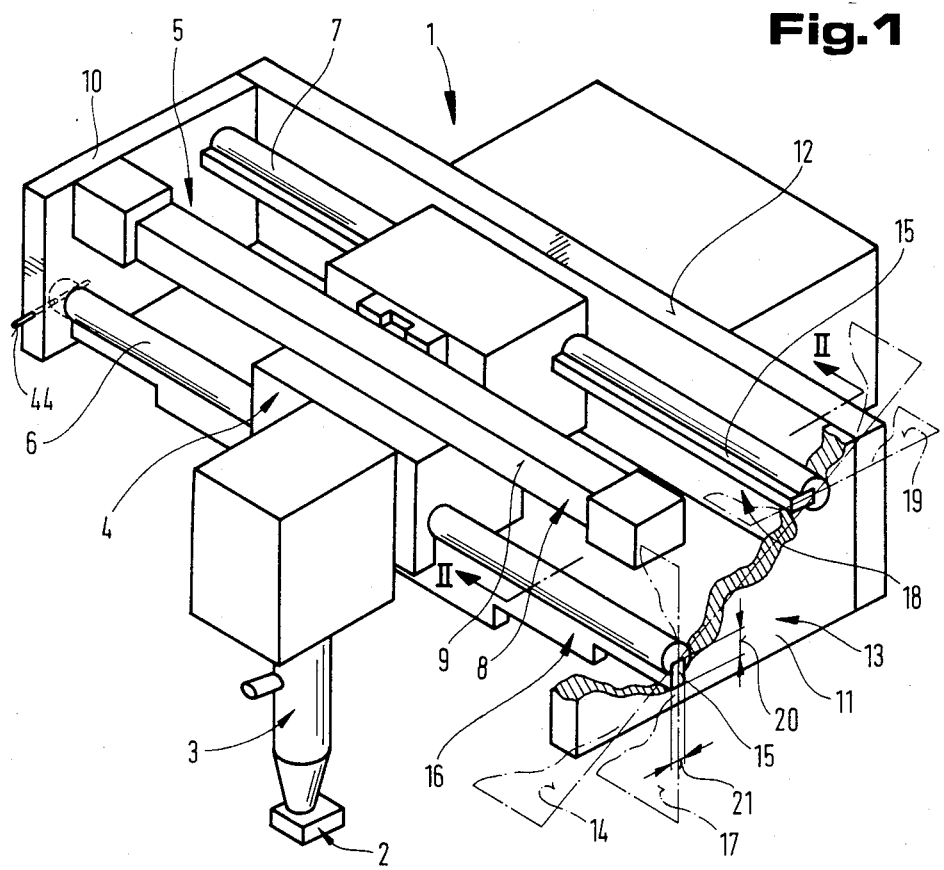
FIG. 1 is a partly sectional perspective view of a system according to the invention for the handling or positioning of components, comprising guiding posts reinforced by means of carrier elements.

A component handling system for handling components 2 by means of a gripper device 3 is illustrated in FIG. 1. The gripper device 3 is secured on an intermediate carrier 4, which is displaceably mounted on a guiding track 5 formed by guiding posts 6 and 7 and is displaceable by means of a displacing device 8 comprising a cylinder-piston system 9. The guiding posts 6 and 7 have their end portions borne in spaced bearing plates 10 and 11 formed jointly with a carrier plate 12 and extending between them and together defining a bearing element 13. The two guiding posts 6 and 7 are offset with respect to each other in horizontal and vertical directions with their axes situated in an inclined plane 14 extending obliquely to the horizontal as seen in FIGS. 1 and 2.

Figure 2:
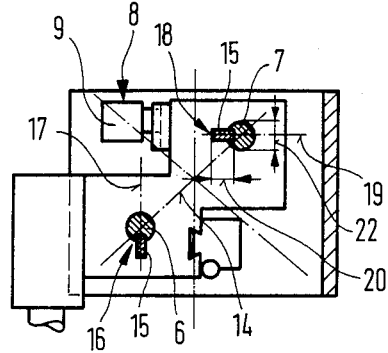
FIG. 2 is a partial section end view of the system according to FIG. 1, taken along the lines II—II.

As shown in FIG. 2 the lower guiding post 6 has a support element formed by a support bar 15 of rectangular cross-section secured thereto at a lower side and extending longitudinally from end-to-end with the cross-section symmetrical about a vertical plane 17 extending through the central axis of the guiding post 6. The support bar 15 serves the purpose of support and reinforcement against stresses in the vertical plane 17.

The upper guiding post 7 is secured to a support element 18 formed by a support bar 15 of rectangular cross-section which is symmetrically arranged with respect to a horizontal plane 19 extending through the central axis of the guiding post 7. The support bar 15 serves the purpose of support and reinforcement against stress in the horizontal plane.

As apparent from the drawings, a cross-sectional height 20 in each case extends parallel to the horizontal or vertical plane 19 or 17, respectively, and is greater than a cross-sectional width 21 of the support bars 15. The cross-sectional width 21 of the support bars 15 is smaller than a diameter 22 of the guiding posts 6 and 7.

The guiding posts 6 and 7 are thus reinforced in the horizontal and vertical planes 19 and 17, respectively, and the guiding track 5 thereby acquires greater rigidity in these two spatial directions. This allows for more precise parallel running of the intermediate carrier 4, since flexing of the guiding posts 6,7 is reduced even under application of substantial forces at the handling device or gripper device 3 in the direction of the horizontal and vertical planes 17 and 19. To obtain an increase of rigidity in the direction of the horizontal and vertical planes 19 and 17, respectively, which corresponds to the flexure graph of the guiding posts 6 and 7, it is possible too—as shown diagrammatically in FIG. 1 in the case of the guiding post 6—to vary or step the cross-sectional height 20 and thus a moment of resistance of the guiding post 6 or 7, in accordance with the flexure line graph which may be expected. The momentary moment of resistance in different longitudinal sections of the guiding post 6 and 7, respectively, may thereby be adapted to the stress arising in these sections, in particular the stresses caused by bending moments due to loads on the handling or gripper device 3.

As shown diagrammatically in FIGS. 1 and 2 the guiding posts 6 and 7 may be constructed with a groove extending longitudinally, which has a width corresponding closely to the cross-sectional width 21 of the support bars 15, so that these may be inserted into the guiding posts 6 and 7.

Figure 3:
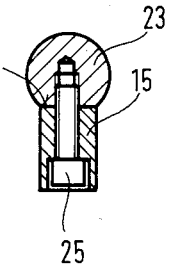
FIG. 3 is a sectional side view of a guiding post with a carrier element secured thereto.

As shown in FIG. 3 in respect of a cross-section through a guiding post 23, the connection of the support bar 15 to the guiding post 23 may be established by constructing the guiding post 23 with a cross-section in the shape of a circular segment having a flat surface 24, the carrier bar 15 being joined at the flat surface 24 by means of screws 25.

Figure 4:
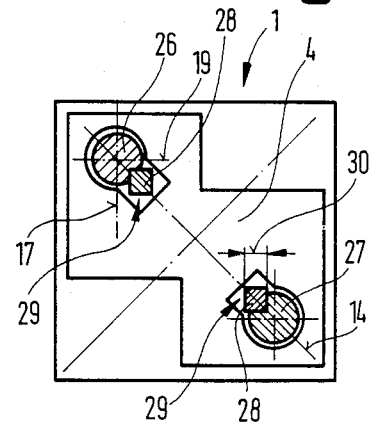
FIG. 4 is a simplified end view of a modified embodiment of the arrangement of the carrier elements associated with the guiding posts of the handling system.

In the embodiment of FIG. 4 a system generally according to FIG. 1 comprising guiding posts 26,27 forming a guiding track are equally arranged in an oblique plane 14 with an intermediate carrier 4 displaceably mounted on the guiding posts 26,27. Support elements 29 formed by support bars 28 are now situated in segments positioned in mirror-symmetry of the circular cross-section of the guiding posts 26,27 for reinforcement of the guiding posts in the horizontal plane 19 and the vertical plane 17. The carrier bars 28 have a square cross-section with a side-length 30. The carrier bars 26 and 27 are thereby reinforced in equal degree in orthogonal spatial directions determined by the planes 17 and 19. It is thereby possible by means of the identical and opposed arrangement, to absorb stresses which occur in the horizontal and vertical planes 19 and 17 in identical proportion in the guiding posts 26,27 and associated support bars 28.

As apparent, the side-length 30 of the support bars 28 is so dimensioned that a diagonal through the cross-section of the carrier bars 28 is shorter than a diameter of the guiding posts 26 and 27 respectively. A precise, playfree guiding action on the intermediate carrier 4 is thereby assured.

The system 1 for handling or positioning components such as workpieces or tools, as illustrated in FIGS. 5 and 6, comprises a bearer member 31 incorporating a carrier plate 32, two spaced bearing plates 33 and further carrier plate 34. Two parallel guiding posts 35,36 are situated in the bearer member 31, with their axes in an oblique plane 14. So that a precisely parallel vertically correct guiding action may be made possible throughout the length of the guiding posts 35, 36 on an intermediate carrier 4, which may have installed on it a gripper device, a tool or the like, each of the two guiding posts 35,36 is carried direct on a respective one of the two carrier plates 32,34 via a support element 37. The support elements 37 are formed by support bars 38 extending from end-to-end and these bars 38 simultaneously serve the purpose of passing through securing elements 39 with which the guiding posts 35,36 are fastened to the carrier plates 32, and stiffening the posts 35,36 against bending.

As more clearly apparent from FIG. 6, the guiding posts 35,36 extend between mutually confronted lateral surfaces of the bearer plates 33 but are not actually anchored in the plates 33. It is thereby possible to absorb longitudinal changes caused by temperature fluctuations during operation, e.g. by heat of friction and the like, evenly throughout the lengths of the guiding posts 35,36 or of the carrier bars 38 associated therewith, on the carrier plates 32 and 34. The bearer plates 33 serve the purpose of bearing the end stops 40 or shock absorbers 41 for the carrier 4. The whole bearer element 31 with the guiding posts 35,36 may be situated on another bearer element 42 of an analogous or similar system 1, each of these systems being liable to form a linear axis of a handling device. It is thus possible to produce guiding post 35 of high load-carrying capacity and comparatively small cross-section, so that the space requirement for the guiding systems allocated to the guiding posts 35,36 in the intermediate carrier 4 may be kept comparatively small. This intermediate carrier may thus also be constructed with comparatively small cross-sectional dimensions, so that even in the case of systems 1 fitted into a spatially restricted volume, sufficient space is retained for a displacing device 8 for the intermediate carrier 4, and, for a measuring system 43 indicated diagrammatically in FIG. 5, within the external delimitations of the bearer element.

The measuring system 43 may for example be formed by a rule provided with code markings and which is scanned during the displacement of the intermediate carrier 4 along the guiding posts 35,36 so that said intermediate carrier may be stopped with dimensional precision, for example even at intermediate positions between the terminal positions determined by the end stops 40, and immobilised by means of a brake as appropriate.

It is also possible within the scope of the invention to equip one guiding post only, instead of both, with an appropriate reinforcement in the required principal stress direction, if this is adequate for the case of application in question. Beyond this, the structure of the support elements or support bars may be modified at will provided that in each instance a reinforcement or increase of rigidity is established in two different spatial directions for the two guiding posts extending parallel to each other.

It is possible furthermore for the guiding posts, for example in the case of the guiding posts 6 and 7 as shown in FIG. 1, to be fixedly installed in one of the two bearer plates 10 and 11, for example as denoted by a retaining pin 44 in the area of the bearer plate 10, whilst being mounted in freely displaceable manner in the oppositely situated bearer plate 11 in the longitudinal direction. It is possible thereby to perform a longitudinal compensation for the lenths of the guiding posts 6,7 due for example to temperature fluctuation without risk of warping of the bearer element 13 or bending of the guiding posts 6,7.

In the embodiment of FIG. 5 the arrangement of the support elements supporting the guiding posts 35 allows an exact guide of the carriage 4 also under eccentric loads formed by the mass—indicated diagrammatically by an arrow 45—of the gripper device even if the ball-bearing guides have a generally C-shaped cross-section as the ball-bearing guides have their open labile sections of the sleeves situated at the sides opposite to the force—arrow 46—in operation.

Figure 7:
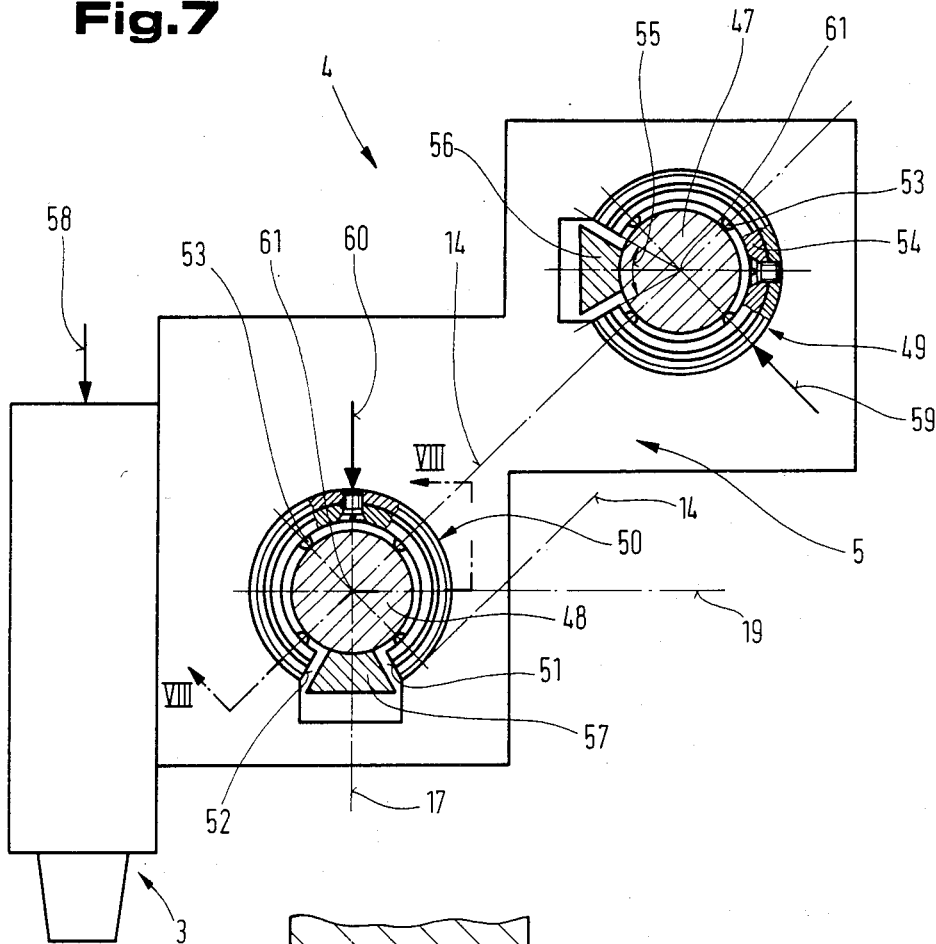
FIG. 7 is a sectional end view, similar to FIG. 2, of a further embodiment.
Figure 8:
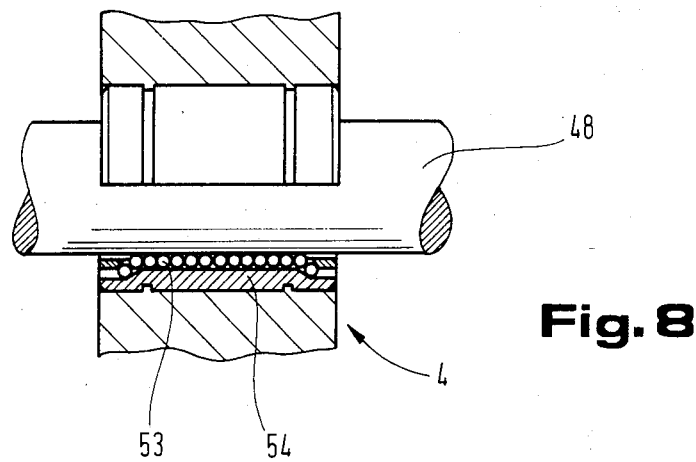
FIG. 8 is a partial cross-section taken on the line VIII—VIII of FIG. 7.

In the embodiment of FIGS. 7 and 8 the guiding track 5 is formed by two guiding posts 47,48 which are placed in a plane 14 arranged obliquely with respect to a horizontal plane 19 as well as to a vertical plane 17. A carriage 4 which is borne on the guiding posts 47,48 via ball-bearing guides 49,50, is displaceable along the two guiding posts 47,48.

The ball-bearing guides 49,50 have a generally C-shaped cross-section, two extremities 51,52 of a C-section sleeve 54 housing the balls 53 being spaced apart from each other over at least an angle of aperture 55 in the peripheral direction of the sleeve. Support elements 56,57 are installed in the surface area of the guiding posts 47,48 which is not encompassed by the sleeve 54, i.e. between the opposed extremities of the C-sections. The guide posts and support elements are joined together, for example by bonding, or as depicted in the preceding figures by clamping action or via mechanical coupling means such as screws or the like. If as shown diagrammatically, a gripper device 3 is now installed on the carriage 4 at a side facing away from the mutually confronted sides of the two guiding posts 47,48—i.e. offset from the guiding track 5—a mass 58 formed by the gripper device and the part picked up with the gripper device—indicated diagrammatically by an arrow—generates a turning moment which tends to pivot the carriage 4 around a centre of the guiding post 48. This causes a turning moment 59 indicated by an arrow 59, which acts on the guiding post 47. By contrast, the guiding post 48 is primarily loaded in the direction of the gravitational force which in the present embodiment extends parallel to the mass 58 and is aligned in vertical direction—arrow 60. The support element 57 is accordingly arranged at the side of the guiding post 48 situated in opposition to the force of gravity—arrow 60—in order to absorb the loads operated in this direction by the mass 58 and to prevent unacceptable flexing of the guiding post 48. The support element 56 which is associated with the guiding post 47 is accordingly also arranged at the side of the guiding post 47 opposed to the turning moment indicated by the arrow 59. This prevents unacceptable flexing of the guiding post during the action of the thrust forces generated by the turning moment. At the same time by this arrangement the ball-bearing guides have their open labile sections of the sleeves 54 situated at the sides opposite to the force in operation. A forcing or opening action on the sleeves 54 is thereby reliably prevented at the guiding posts 47 and 48, even if these are stressed by great forces.

As also shown diagrammatically in FIG. 7, it is immaterial regarding the embodiments of the present invention, whether the sloping plane 14 extends through centres 61 of the guiding posts 47,48 or whether this plane 14 extends tangentially to the guiding posts 47 to 48 as denoted diagrammatically in the area of the guiding post 48.

The arrangement of the balls 53 which support the sleeve 54 and thus the carriage 4 on the guiding post 48, is shown in FIG. 8.

Let it be said in connection with the inventive solution, that an independent inventive solution may also be recognised in the relative arrangement of the sleeves of the ball-bearing guides in the case of loads positioned eccentrically with respect to the guiding track 5, notwithstanding the arrangement of the support elements. Beyond this, in the case of loads applied exclusively in the horizontal plane 19 or in the vertical plane 17, the support elements at both guiding posts may also be situated in the horizontal or vertical plane or in planes extending parallel to these. Furthermore, an independent inventive solution may in each case be recognised in the structure of the carrier elements as support bars extending in the longitudinal direction of the guiding track, as well as in the particular method of fastening the guiding posts on the support bars or in the combination of the arrangement and/or fastening of the support bars with the guiding posts in the carrier plates 10,11 especially if only the support elements are anchored in the carrier plates 10,11 and the guiding posts are mounted on the support elements in longitudinally displaceable manner.

In the case of highly stressed guiding tracks 5, another advantage of the arrangement of the support elements primarily consists in that a greater cross-sectional area is available for heat dissipation, so that longitudinal changes or cross-sectional changes caused by great temperature differentials may be reliably prevented or reduced to a minimum.

While the invention and many of its attendant advantages will be understood from the foregoing description, it will be apparent that various changes may be made in the form, construction and arrangement of the parts without departing from the spirit and scope of the invention or sacrificing its attendant advantages, the form hereinbefore described merely being a preferred embodiment thereof.

What is claimed is:

1. A handling system for handling or positioning components or tools, which comprises a guiding track formed by a pair of spaced guiding posts having parallel longitudinal axes, an intermediate carrier for the components or tools displaceably mounted on the guiding track, means coupled to the intermediate carrier for displacing and positioning the intermediate carrier along the guiding posts, and respective guiding post support elements extending therealong parallel to the longitudinal axes of the guiding posts in respective planes passing through said longitudinal axes and defining a dihedral angle therebetween, the support elements being arranged to stiffen the guiding posts and to support them against bending under forces operating on the intermediate carrier when handling the components or tools.

2. A handling system according to claim 1, in which the support elements are bars having a rectangular cross-section of a width smaller than a diameter of the guiding posts and a height, the heights of the two bars being angularly set to each other at 90°, the widths being arranged symmetrically with respect to the respective longitudinal axes of the guiding posts.

3. A handling system according to claim 2, in which each guiding post is provided with a longitudinal groove having a width corresponding to the width of the associated bar and the longitudinal grooves are arranged at 90° with respect to each other.

4. A handling system according to claim 1, in which the intermediate carrier is borne via ball-bearing guides on the guiding posts, the ball-bearing guides having a C-shaped cross-section, with mutually confronted extremities of each C-section being peripherally spaced apart and the support elements being disposed between the opposed extremities of the associated bearing guides.

5. A handling system according to claim 1, in which a gripper device is installed on the intermediate carrier on a longitudinal side of a first one of the guiding posts facing away from the other guiding post and the support element at the first guiding post lying closest to the gripper device is situated at a side opposed to an action of a gravitational force at the gripper device, and at the other guiding post more distant from the gripper device the associated support element is situated at a side opposed to a turning moment acting around the first guiding post.

6. A handling system according to claim 1, further comprising respective carrier plates for the guiding posts, two carrier plates extending in respective planes extending perpendicularly to a third plate, the respective guiding post support elements being arranged between the two carrier plates, and releasable securing elements for fastening the guiding posts to the two carrier plates.

7. A handling system according to claim 1, further comprising two carrier plates respectively holding opposite ends of the guiding posts, one of the ends of the guiding posts being fixedly secured to one of the carrier plates and the opposite ends of the guiding posts being displaceably held in an opposite one of the carrier plates.

* * * * *